United States Patent
Newman et al.

(10) Patent No.: US 11,415,697 B2
(45) Date of Patent: Aug. 16, 2022

(54) REAL-TIME IMAGE FORMATION FROM GEIGER-MODE LADAR

(71) Applicant: Raytheon Company, Waltham, MA (US)

(72) Inventors: Arthur M. Newman, Sherman Oaks, CA (US); Eran Marcus, Culver City, CA (US); Brian Boland, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 735 days.

(21) Appl. No.: 16/419,768

(22) Filed: May 22, 2019

(65) Prior Publication Data

US 2020/0371240 A1 Nov. 26, 2020

(51) Int. Cl.
| | |
|---|---|
| *G01S 17/89* | (2020.01) |
| *G01J 1/44* | (2006.01) |
| *G01S 7/4863* | (2020.01) |
| *G01S 17/08* | (2006.01) |

(52) U.S. Cl.
CPC ............ *G01S 17/89* (2013.01); *G01J 1/44* (2013.01); *G01S 7/4863* (2013.01); *G01S 17/08* (2013.01); *G01J 2001/4466* (2013.01)

(58) Field of Classification Search
CPC ........ G01S 17/89; G01S 7/4863; G01S 17/08; G01J 2001/4466
See application file for complete search history.

(56) References Cited

U.S. PATENT DOCUMENTS

| 2016/0266243 A1* | 9/2016 | Marron ............... G01S 7/4865 |
| 2019/0056497 A1 | 2/2019 | Pacala et al. |

FOREIGN PATENT DOCUMENTS

EP 3370080 A1 9/2018

OTHER PUBLICATIONS

O. Smith, et al. "Point Spread Function (PSF) noise filter strategy for geiger mode LiDAR", Event: SPIE Defense, Security, and Sensing, 2013, Baltimore, Maryland, United States, SPIEDigitalLibrary.org/conference-proceedings-of-spie, May 28, 2013, 9 pages.

(Continued)

*Primary Examiner* — Georgia Y Epps
*Assistant Examiner* — Don J Williams (57) ABSTRACT

A measured photo-event array is converted from two spatial coordinates and one temporal coordinate into three spatial coordinates for real-time imaging. Laser light pulses illuminate at least one object, and a Geiger-mode avalanche photodiode array receives photons from laser light reflected off the object. For each pulse of the laser light, the GMAPD outputs a first array of photo-events representative of reflected photons. A three-dimensional (3D) Gaussian distribution kernel arranged as a list of array locations to be processed and weight list(s) are provided. The weight list(s) specify an amount array values are scaled based on the Gaussian distribution or photon arrival time. A graphics processing unit arranges the first array of measured photo-events as a list, convolves the Gaussian displacement list with the list of measured photo-events to produce a convolution output, and applies weights from the weight list(s) to the values to produce a density point cloud.

20 Claims, 8 Drawing Sheets

(56) References Cited

OTHER PUBLICATIONS

F. Homm, et al., "Efficient Occupancy Grid Computation on the GPU with Lidar and Radar for Road Boundary Detection", 2010 IEEE Intelligent Vehicles Symposium University of California, San Diego, CA, USA Jun. 21-24, 2010, pp. 1006-1013.

V. Venugopal, et al. "Accelerating Real-time LiDAR Data Processing using GPUs", United Technologies Research Center 411 Silver Lane, E Hartford, CT USA, Apr. 2013, pp. 1168-1171.

N. Shorter, et al., "Massively Parallelized Point Spread Function Noise Filtering for Geiger Mode LiDAR", GPU Technology Conference, Category: Video & Image Processing—V102, Apr. 2014, 1 page.

International Search Report and Written Opinion of the International Searching Authority dated May 4, 2020 in connection with International Patent Application No. PCT/US2020/013871, 12 pages.

\* cited by examiner

REAL-TIME IMAGE FORMATION FROM GEIGER-MODE LADAR

GOVERNMENT RIGHTS

This invention was made with U.S. government support under contract no. FA8650-14-C-7428 awarded by the Department of Defense. The U.S. government may have certain rights in this invention.

TECHNICAL FIELD

The present disclosure is directed in general to laser radar sensors, and more particularly, to improving real-time image formation from Geiger-mode laser radar sensors.

BACKGROUND OF THE DISCLOSURE

Geiger mode (GM) imaging laser radar (LADAR) systems produce data in the form row:column:time (i.e., XYT), where row and column are in focal plane coordinates and time is on the order of nanoseconds. To be useful for visualization, detection, identification, etc., the data format must first be transformed into an XYZ coordinate system, and then multiple frames of data must be combined so that the signal-to-noise ratio (SNR) is increased. In addition, Geiger mode avalanche photodiode (GMAPD) detectors suffer from blocking loss, where returns from the leading edge of an object blocks returns from the trailing edge, distorting measured range profiles.

O'Neil Smith, Robert Stark, Philip Smith, Randall St. Romain, and Steven Blask, "Point Spread Function (PSF) noise filter strategy for geiger mode LiDAR," Proc. SPIE 8731, Laser Radar Technology and Applications XVIII, 87310A (28 May 2013), three-dimensional (3D) Gaussian convolution on graphics processing units (GPUs) is suggested, although the implementation details are unclear. The algorithm as described generates point clouds, not volume images. Florian Homm, Nico Kaempchen, Jeff Ota and Darius Burschka, "Efficient Occupancy Grid Computation on the GPU with Lidar and Radar for Road Boundary Detection," 2010 IEEE Intelligent Vehicles Symposium, University of California, San Diego, Calif., USA, Jun. 21-24, 2010 suggests use of GPUs for real-time lidar processing with GPU-specific algorithm enhancements, but discloses an occupancy grid technique, not convolution. Venugopal, Kannan: "Accelerating Real-time LiDAR Data Processing using GPUs," 2013 IEEE 56th International Midwest Symposium on Circuits and Systems (MWSCAS), 4-7 Aug. 2013 also suggests use of GPUs for real-time lidar processing with GPU-specific algorithm enhancements, but describes a ray-triangle intersection algorithm for digital elevation map generation unrelated to image formation.

There is, therefore, a need in the art for combining multiple frames of Geiger mode LADAR data while correcting for saturation of detector response in real time.

SUMMARY OF THE DISCLOSURE

In one embodiment, an apparatus converts measured photo-events from a format according to two spatial coordinates and one temporal coordinate into a format according to three spatial coordinates. Within the apparatus, a laser is configured to pulse laser light illuminating at least one object, and a Geiger-mode avalanche photodiode (GMAPD) array is positioned to receive photons from portions of the laser light reflected off the at least one object. The GMAPD is configured to output, for each pulse of the laser light, a first array of photo-events representative of portions of the reflected light incident on the GMAPD array. A Gaussian displacement list forming a filter corresponding to a three-dimensional (3D) Gaussian distribution is provided, the filter arranged as a list of array locations to be utilized. A first weight list and a second weight list are also provided, the first weight list specifying an amount by which to increment array values based on the Gaussian distribution and the second weight list for blocking loss compensation according to an arrival time of measured photo-events. A graphics processing unit is configured to arrange the first array of photo-events as a list of measured photo-events, convolve the Gaussian displacement list with the list of measured photo-events to produce a convolution output, apply weights from the first weight list to the values within corresponding locations of the convolution output to produce a weighted convolution output, and apply weight from the second weight list to produce a density point cloud. The Gaussian displacement list comprises a list of translations from an origin of the 3D Gaussian distribution, and is optionally thresholded and weighted by the first weight list such that it does not occupy a full 3D encompassing volume. Optionally, the list of measured photo-events is a sparse list containing only non-zero values. Preferably, the second weight list more heavily weights values corresponding to later times within a range gate than list locations corresponding to earlier times within the range gate. The first array of photo-events is an $N_R \times N_C$ array, where at least one of $N_R$ and $N_C$ is greater than one, for each of a plurality of frames, and the plurality of frames encompasses the 3D Gaussian distribution, which is centered on an origin. The first array of photo-events contains one photo-event for each pixel in each the plurality of frames. The graphics processing unit is further configured to aggregate an image portion represented by the density point cloud with other image portions to provide real-time image formation. Optional processing circuitry coupled to the graphics processing unit may be configured to receive the density point cloud and determine a range to the at least one object.

In another embodiment, a method converts measured photo-events from a format according to two spatial coordinates and one temporal coordinate into a format according to three spatial coordinates. A laser is pulsed to illuminate at least one object with laser light. A GMAPD array is positioned to receive photons from portions of the laser light reflected off the at least one object, and is configured to output, for each pulse of the laser light, a first array of photo-events representative of portions of the reflected light incident on the GMAPD array. A Gaussian displacement list is provided, forming a filter corresponding to a 3D Gaussian distribution, the filter arranged as a list of array locations to be utilized. A first weight list and a second weight list art also provided, the first weight list specifying an amount by which to increment array values based on the Gaussian distribution and the second weight list for blocking loss compensation according to an arrival time of measured photo-events. The first array of photo-events is arranged as a list of measured photo-events, the Gaussian displacement list is convolved with the list of measured photo-events to produce a convolution output, weights from the first weight list are applied to the values within corresponding locations of the convolution output to produce a weighted convolution output, and weight from the second weight list are applied to value in the weighted convolution output to produce a density point cloud. The Gaussian displacement list comprises a list of translations from an origin of the 3D Gaussian distribution, and is optionally thresholded and weighted by the first weight list such that it does not occupy a full 3D encompassing volume. Optionally, the list of measured photo-events is a sparse list containing only non-zero values. Preferably, the second weight list more heavily weights values corresponding to later times within a range gate than list locations corresponding to earlier times within the range gate. The first array of photo-events is an $N_R \times N_C$ array, where at least one of $N_R$ and $N_C$ is greater than one, for each of a plurality of frames, and the plurality of frames encompasses the 3D Gaussian distribution, which is centered on an origin. The first array of photo-events contains one photo-event for each pixel in each of the plurality of frames. The graphics processing unit is further configured to aggregate an image portion represented by the density point cloud with other image portions to provide real-time image formation. Optional processing circuitry coupled to the graphics processing unit may be configured to receive the density point cloud and determine a range to the at least one object.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

The iterative closest point (e.g., coincidence processing) algorithm approach, such as a maximum a posteriori coincidence processing (MAPCP) algorithm, which minimizes the difference between two clouds of points, may be used in LADAR processing by counting the number of LADAR photo-events for each voxel within a specified radius to produce a density cloud (density image). To prevent blocking loss, LADARs may be operated at low return levels (e.g., <1 photon per pixel per frame) to prevent the leading edge of the object from blinding the detector.

In the present disclosure, however, a 3D Gaussian filter is used to produce a density point cloud. A parameterized 3D Gaussian filter output is transformed into a list of translations from the origin and a corresponding list of weights. The photo-events provided by the LADAR are then processed as a list, saving time in proportion to the sparsity of the photo-events. The Gaussian filter provides a well-understood framework for parameterization to adjust for sensor and target characteristics. The list of photo-events is processed such that the Gaussian displacement list is used to indicate which array location(s) are to be utilized. A weight list specifies the amount by which to increment the values utilized. Density point clouds may thus be provided and updated in real-time through a technique that reformats the LADAR data in such a way as to be optimized for the graphics processing unit (GPU). By reformatting, most of the atomic operations unformatted data would require are avoided, allowing real-time transformation.

In the present disclosure, multiple frames of LADAR data are combined using a novel method of representing the LADAR data and Gaussian kernel, enabling real time performance, together with correction for saturated response of the detector to improve the fidelity of measured profiles in the range dimension. This may be used for air-to-ground applications, such as scanning and mapping, or ground-to-air applications, such as range-finding for the most significant object within the field of view. The techniques of the present disclosure are well-suited to data acquired over short times (e.g., milliseconds worth of data) for fast (immediate) processing to generate an image of a localized object. Although generically a GPU-optimized algorithm, the present disclosure utilizes a different decomposition of the problem onto GPU resources than other proposed approaches.

Figure 1:
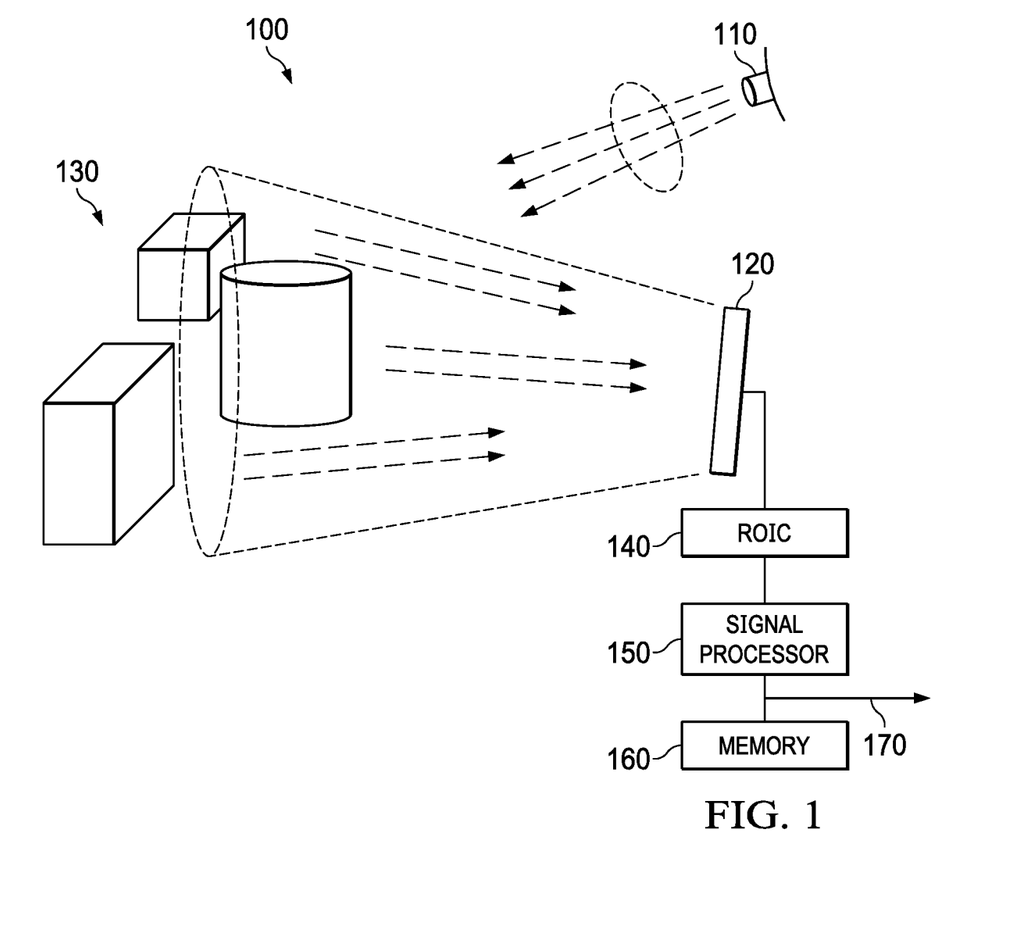
FIG. 1 diagrammatically illustrates a Geiger-mode LADAR system for real-time image formation in accordance with embodiments of the present disclosure.

FIG. 1 diagrammatically illustrates a Geiger-mode LADAR system for real-time image formation in accordance with embodiments of the present disclosure. A LADAR system 100 may include a laser transmitter 110 configured to transmit pulses at a pulse repetition frequency, e.g., 20 kilo-Hertz (kHz), and a camera including imaging optics (not shown) and a GMAPD array 120. The GMAPD array 120 may detect LADAR return photons that are transmitted in the pulses and reflected from a target 130 into the camera. The GMAPD array 120 may have a frame rate equal to the pulse repetition frequency, and it may be synchronized with the laser transmitter 110 so that each frame captured by the camera includes only signal corresponding to a single transmitted pulse. The reciprocal of the frame rate may be referred to as the "frame period."

During any frame acquisition interval (i.e., the period of time during which the GMAPD array 120 captures one frame of data), one or more of the Geiger-mode avalanche photodiodes or "detector pixels" may register a photon detection, and generate a corresponding electrical pulse, which may be sensed by the readout integrated circuit (ROIC) 140. The ROIC 140 may record the time at which the electrical pulse was received, to within a certain time resolution, e.g., 1.25 nanoseconds (ns), corresponding, for example, to a period of a clock of the ROIC 140. In each frame, the detected photons may then be classified into time bins according to their arrival times, with, e.g., the photons detected at the beginning of the frame being in bin 0, the photons detected during a time interval beginning 1.25 ns later, and ending 2.5 ns later, being in bin 1, and so on.

The output from the ROIC 140 for each frame may be a 3-dimensional array, referred to herein as the "ROIC output array," with two of the dimensions being pixel dimensions and the third dimension being bin number (effectively, time). Each element of the array may be either a 1 (if a photon was detected by the corresponding pixel in the corresponding time bin) or a 0 (e.g., if no photon was detected by the corresponding pixel in the corresponding time bin). Because round trip travel time corresponds to the range of the target, the time bins may also be referred to as range bins. Each avalanche photodiode may be reset once per frame, at the beginning of the frame, and each avalanche photodiode may have the characteristic that it will generate at most one electrical pulse per frame, i.e., after generating a pulse, the avalanche photodiode may be disabled for the remainder of the frame, and incapable of generating another pulse, until it is reset at the beginning of the next frame.

The electrical pulses generated by the GMAPD 120 may also include noise pulses, which may be caused by any of several mechanisms including photons received by the camera that are not LADAR return photons, and dark noise (e.g., thermal noise) in the avalanche photodiode. The effects of this noise may be that (i) some elements of the ROIC output array may be 1 that in the absence of noise would have been 0, as a result of a noise pulse, and (ii) some elements of the ROIC output array may be 0 that in the absence of noise would have been 1, as a result of a pixel receiving a LADAR return photon after having been disabled by a noise pulse produced earlier in the same frame.

The GMAPD array 120 may also operate with a range gate, i.e., a signal that enables it only during a portion of a frame, e.g., a portion corresponding to an estimated range to the object(s) of interest. The use of the range gate may reduce the effect of noise pulses that otherwise would be generated outside of the range gate time interval, e.g., well before the first LADAR return photons from a given laser transmitter pulse, or well after the last LADAR return photons. The ROIC output array may be sized accordingly. If, for example, the GMAPD array 120 has a size of 30×30 pixels, and if the length of the range gate is 4,000 bins, then the ROIC output array may have dimensions of 30×30× 4000. Each 30×30 slice of the array corresponding to one time bin may be referred to herein as a bin slice of the ROIC output array.

The ROIC output array may be subsequently processed, e.g., by a processing circuit 150, in the manner described herein. The subsequent processing may include, for example, employing a "chipping" algorithm to discard bin slices of a ROIC output array corresponding to bins that are too early or too late to be likely to include any signals corresponding to object(s) of interest within the returned image. The chipping algorithm may employ information in the ROIC output array (or in a set of ROIC output arrays) and may set a chipping time interval (outside of which signals are discarded) that is significantly shorter than the range gate time interval, without discarding a significant amount of data corresponding to LADAR return photons. The input to the chipping algorithm, for each frame, may be a one-dimensional array of sums over the bin-slices of the frame, referred to herein as the "range histogram" or "range histogram array" for the frame.

In some embodiments a set of ROIC output arrays, e.g., a set corresponding to a contiguous set of frames, may be combined and further processed to improve the signal to noise ratio, or to obtain additional information such as a target range rate. The set of ROIC output arrays may be stored in a memory 160 coupled to the processing circuit 150, and/or output via an output 170. Certain elements of the processing described herein as being performed in the processing circuit 150 may equally well be performed in the ROIC 140, and vice versa. System design requirements including power and heat management, and the bandwidths of interfaces between elements of the system, may influence where various processing operations are performed. The ROIC 140, processing circuit 150 and memory 160 collectively form a GPU.

Figure 2:
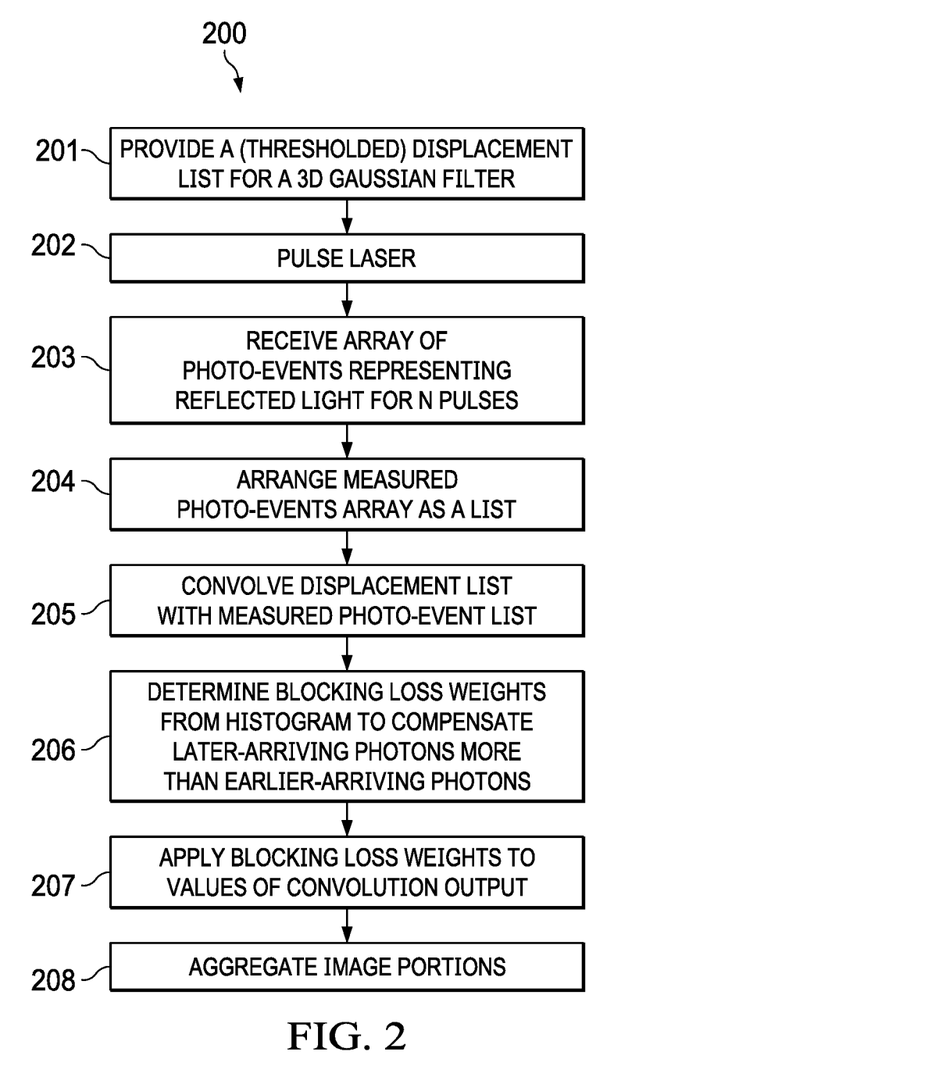
FIG. 2 is a high level flowchart illustrating the processing employed for real-time image formation from Geiger-mode LADAR returns in accordance with embodiments of the present disclosure.

FIG. 2 is a high level flowchart illustrating the processing employed for real-time image formation from Geiger-mode LADAR returns in accordance with embodiments of the present disclosure. The process 200 is implemented by ROIC 140 and/or processing circuit 150, operating on the LADAR returns output by GMAPD array 120. The process 200 utilizes a parameterized 3D Gaussian kernel, an array approximating a 3D Gaussian distribution that will be convolved with the measured data and which is stored in one or more of ROIC 140, processing circuit 150 and/or memory 160. The 3D Gaussian kernel has preferably been transformed into a list of translations from the origin, or a "displacement list." The displacement list for the 3D Gaussian kernel is thresholded to yield a filter that does not occupy the full 3D encompassing volume, so that the center is retained and the perimeter ignored by the filter. The displacement list will be convolved with the array of measured photo-events, arranged as a list as described in further detail below. Thresholding of the displacement list involves selecting a threshold value for photo-events, such that photo-events within the array that have less than the threshold value will not be processed. For example, the standard deviation (SD) of the 3D Gaussian distribution may be used to process only values having a magnitude falling within a selected number (integer, fractional, or mixed) of standard deviations from the center (mean or peak) value. Alternatively, a numeric threshold may be selected, for example, as a fraction of the peak value. The threshold value utilized may impact the processing speed by decreasing or increasing a number of photo-events that must be processed. Thus, process 200 begins with providing a displacement list for a 3D Gaussian filter (step 201).

Within the process 200, photo-events provided by the LADAR are processed as a list. Thus, process 200 involves (repetitively) pulsing a laser to project laser light onto a target (step 202), receiving a (spatial) array of photo-events representing laser light reflected off a portion of the target for each of $N_P$ laser pulses (step 203), and arranging the measured photo-event array as a list (step 204). In some embodiments, the list may be a sparse list of just locations within the array of photo-events having non-zero values (separate from thresholding of the measured photo-event values to reduce the number of measured photo-events being processed). As noted above, for a pulse of emitted laser light (frame), each pixel provides only one photo-event for the frame. The list of photo-events is processed such that the Gaussian displacement list is used to indicate which array locations are to be processed. The Gaussian displacement lists may include associated weights based on the Gaussian distribution, to adapt measured photo-events to the Gaussian distribution. The Gaussian displacements and weights are not dependent on the data, and so can be computed once and applied to multiple data sets.

The displacement list is convolved with the measured photo-event list (step 205) to determine measured photo-events to be processed. Other measured photo-events—those not corresponding to the weighted and/or thresholded displacement list locations—are ignored. As a result, the measured photo-events that are processed do not correspond to the full 3D space.

Figure 3A:
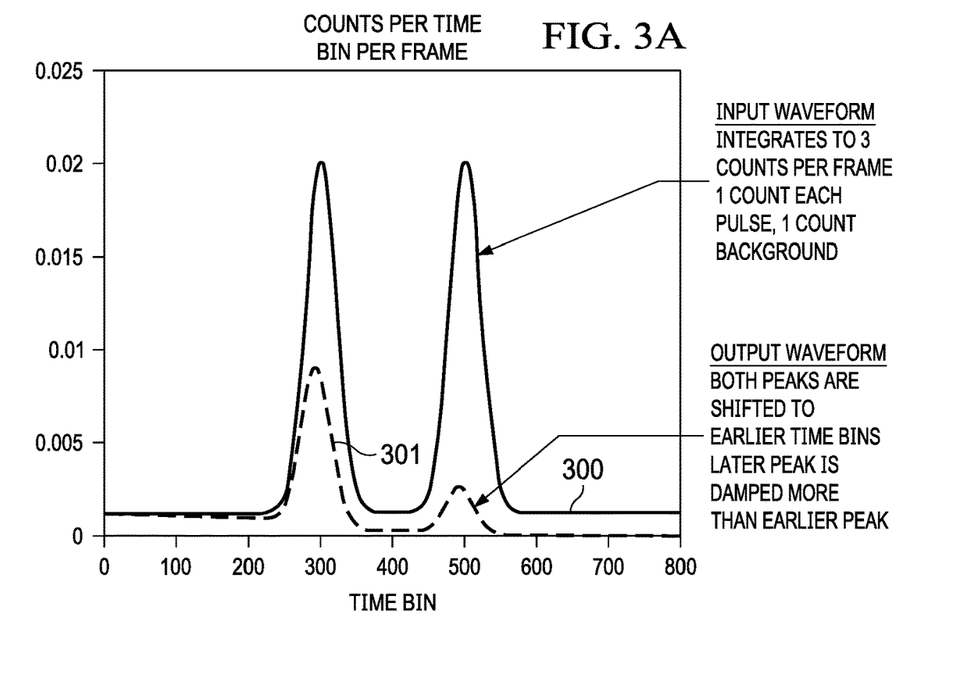
FIGS. 3A and 3B illustrate the saturated response of pixels for a Geiger-mode LADAR system.
Figure 3B:
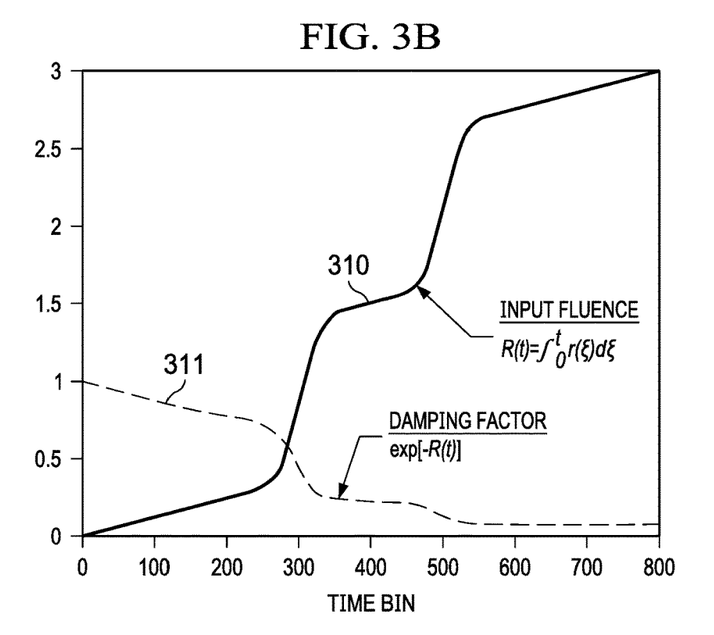

After converting frame data to a list of photo-events to be processed by convolution with the displacement list, the histogram for each detector is employed to calculate blocking loss compensation weights so that photon arrivals later in time are compensated more than photo arrivals earlier in time for a given pulse or frame (step 206). As noted above, blocking loss and other range dependencies skew the relationship between brightness and time of return. FIGS. 3A and 3B illustrate the saturated response of pixels for LADAR system 100 and compensation according to embodiments of the present disclosure. As illustrated in FIG. 3A, the input waveform 300 to be processed (the output from the detector array) should correspond to the waveform of the laser pulses—that is, peaks corresponding to two consecutive pulses centered around time bins spaced according to the timing of the laser pulses, for the example shown. However, within the actual detector array output 301, both peaks are shifted to earlier time bins, and the later peak is damped more than the earlier peak. The relationship between waveform 300 and waveform 301 may be modeled as a mean count rate r(t) that includes signal $r_s(t)$, background $r_b(t)$, and dark count $r_d(t)$ rates:

$$r(t)=r_s(t)+r_b(t)+r_d(t).$$

As illustrated in FIG. 3B, the input fluence R(t) 301 that would compensate for the difference between waveforms 300 and 301 is the mean number of input counts that have accumulated at time t:

$$R(t)=\int_0^t r(\xi)d\xi,$$

where the (damped) output waveform h(t) is that probability density of the time stamps—that is, a scaled version of the range histogram:

$$h(t)=r(t)e^{-R(t)}.$$

The output fluence H(t) is the cumulative probability distribution of time stamps, or the probability that the time stamp occurred at or before time t:

$$H(t)=P(\tau \leq t)$$

$$H(t)=\int_0^t h(\xi)d\xi.$$

Here τ is a random variable corresponding to the time stamp. H(t) can also be written in terms of the input fluence R(t) as follows:

$$H(t)=1-P(\tau>t)$$

$$H(t)=1-P(x_{[0,t]}=0)$$

$$H(t)=1-e^{-R(t)}$$

where $x_{[0,t]}$ is a Poisson distributed random variable corresponding to the number of counts occurring on the time interval [0, t].

Figure 4A:
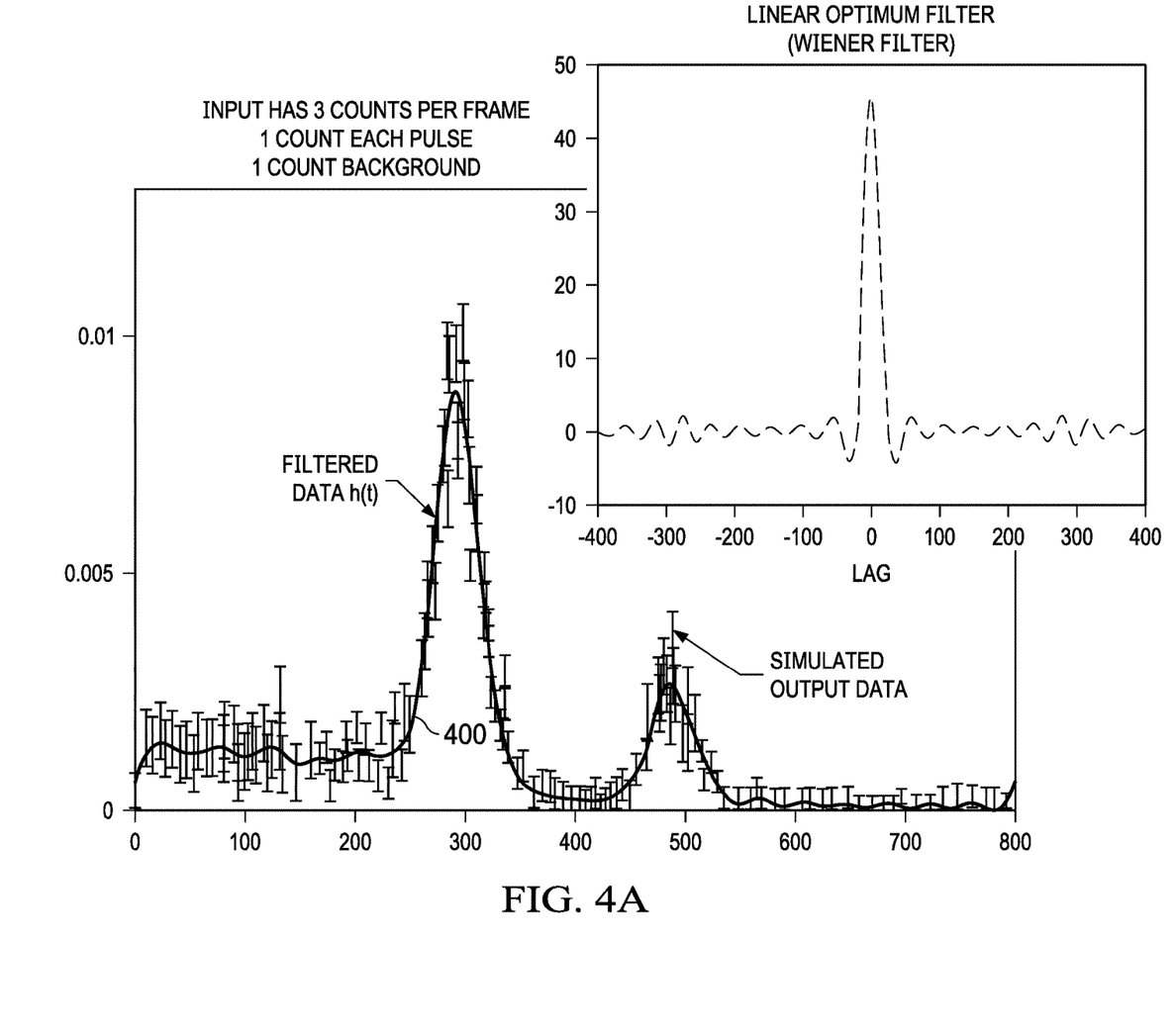
FIGS. 4A and 4B illustrate recovery of the input a Geiger-mode LADAR system.
Figure 4B:
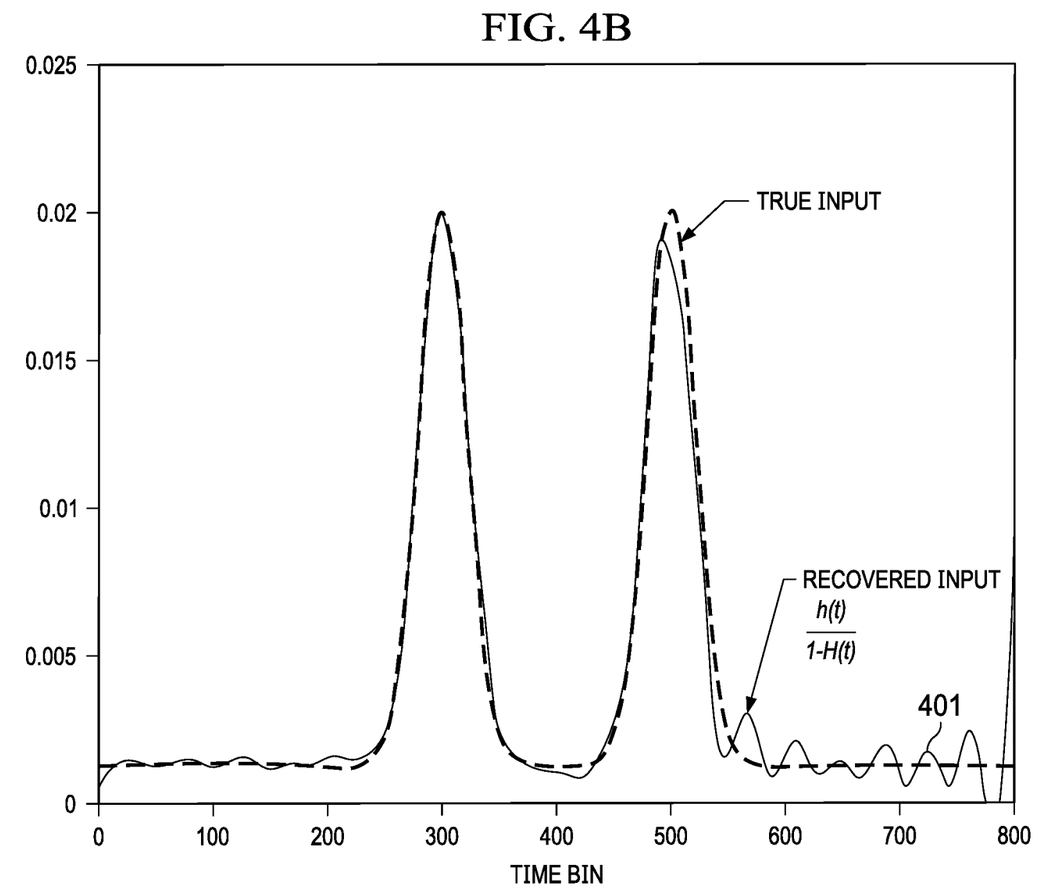

Referring back to FIG. 2, in the process 200, range dependent and data dependent scaling is applied to each pixel to recover true signal from saturated response. FIGS. 4A and 4B illustrate approximate recovery of the input using a weight list. To recover the input waveform r(t) 300 from a given filtered output waveform h(t) 301, illustrated as simulated ranges of photo-events 400 in each time bin within FIG. 4A that corresponds to a filtered data waveform h(t), the input fluence R(t) is solved for in terms of the output fluence H(t):

$$H(t)=1-e^{-R(t)}$$

$$e^{-R(t)}=1-H(t)$$

$$R(t)=\log [1-H(t)].$$

The time derivative is taken to get the relation between the input and output waveforms:

$$r(t) = \frac{h(t)}{1-H(t)}$$

$$r(t) = h(t)e^{R(t)}.$$

The recovered input 401 (an approximation of the true input) depicted in FIG. 4B is an amplified version of the output, where different portions of the waveform are compensated by the values in the weight list. Uncertainty in the recovered data is larger at the end of the range gate.

In the process 200, pixels within the convolution output that are saturated early may be corrected by blocking loss compensation scaling factors (step 207), weighting later returns more heavily than early returns, according to the offset/weight lists. The blocking loss compensation weights are computed over the data after it has been converted from X,Y,time to X,Y,Z and must be recomputed for each data set. The blocking loss compensation array is the same size as the data array after convolution with the Gaussian distribution. The Gaussian weights may be applied to the data concurrently with or separately from the blocking loss compensation. Unlike the Gaussian weights, however, the blocking loss compensation varies as a function of the location of the data element. Specifically, if we are processing a photo-event at location $X_1,Y_1,Z_1$, each element of the Gaussian displacement list is added to the photo-event's location and results in an output location $X_2,Y_2,Z_2$. The value at that output location will be increased by the Gaussian weight associated with that element of the displacement list, and multiplied by the blocking loss compensation array value at $X_2,Y_2,Z_2$. The deterministic effect of blocking loss is therefore corrected over many frames for one dwell—for example, several thousand frames. Image portions may then be aggregated to form an image (step 208). In other embodiments, a range determination may be made, or the data otherwise used.

Figure 5:
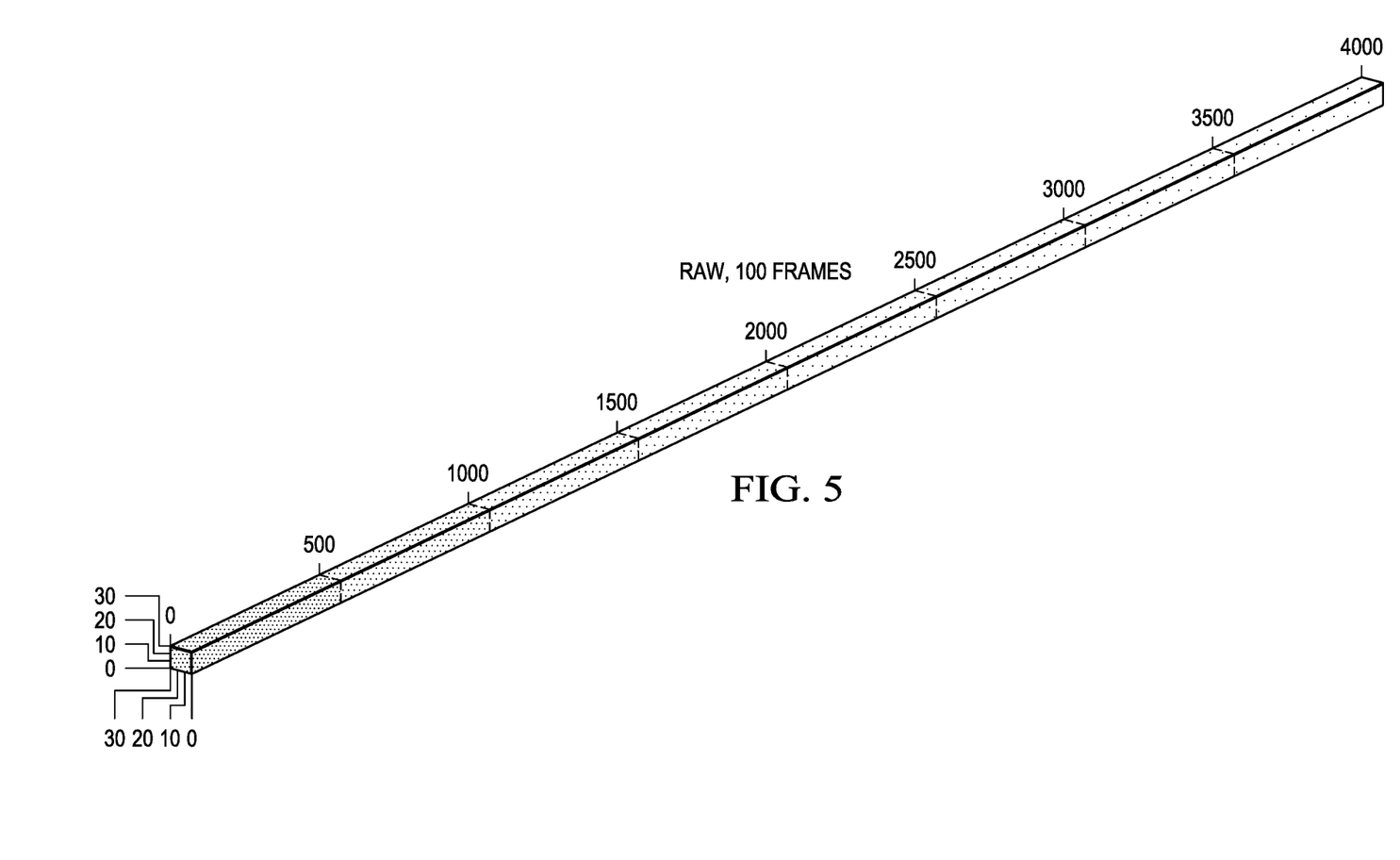
FIGS. 5, 6 and 7 illustrate raw and processed returns from Geiger-mode LADAR returns in accordance with embodiments of the present disclosure.
Figure 6:
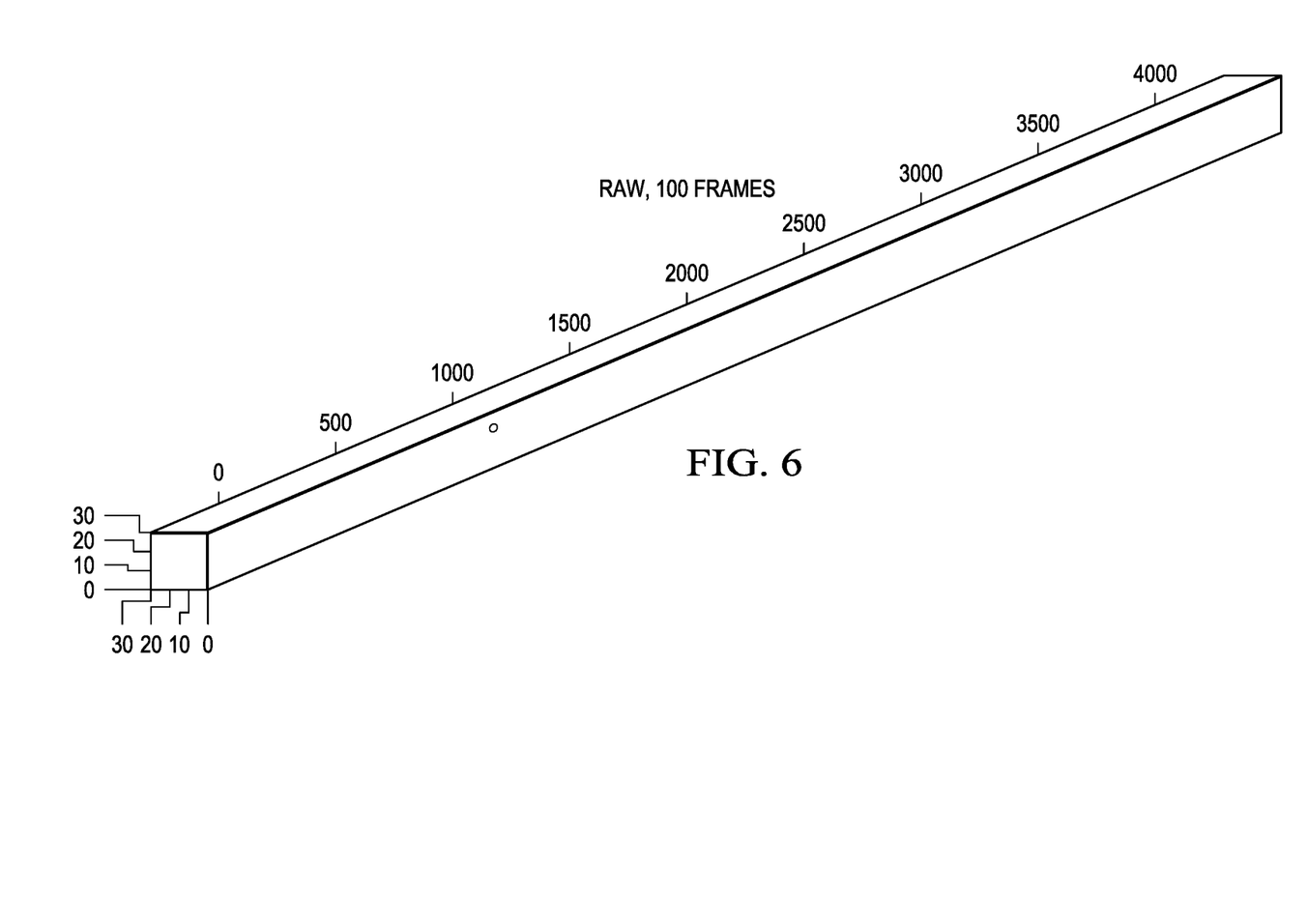
Figure 7:
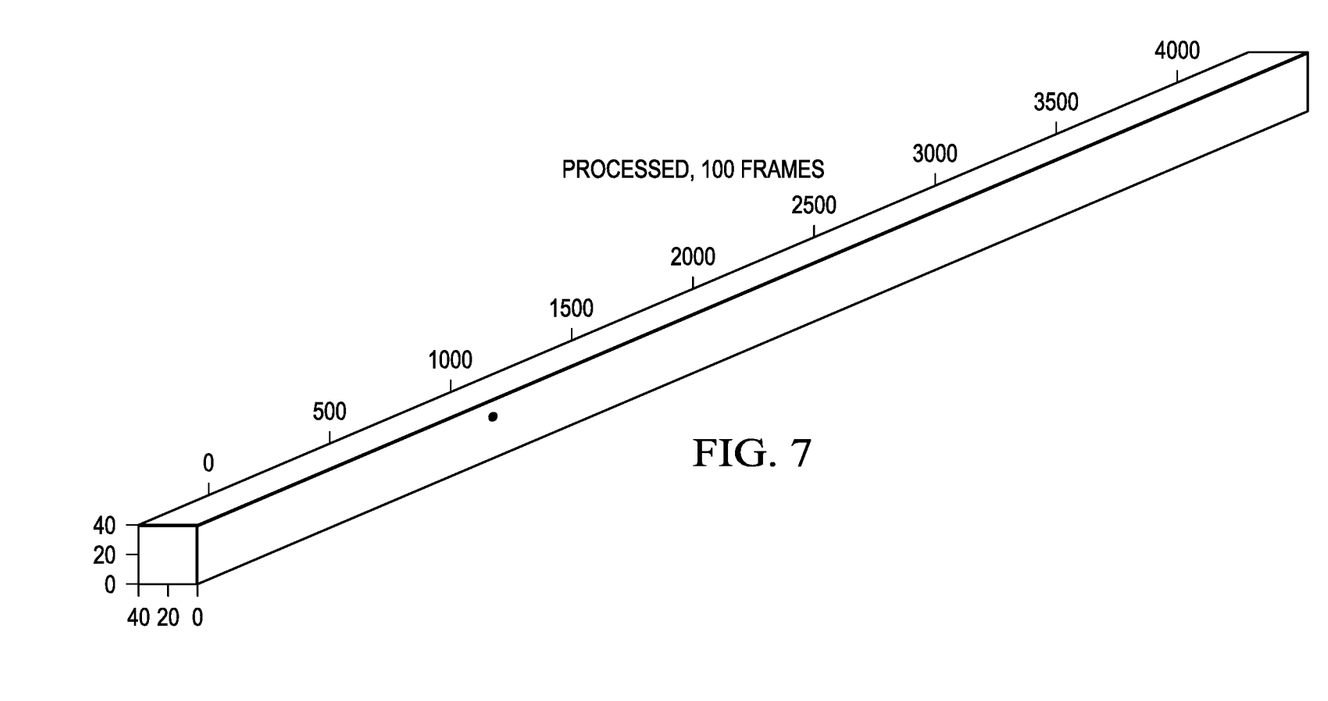

FIGS. 5, 6 and 7 illustrate raw and processed LADAR returns from a LADAR system 100. Each of the plots depicted in FIGS. 5 and 6 corresponds to a 30×30 (XY coordinate) slice of LADAR data over a range gate of 100 pulse repetitions (frames), while the plot depicted in FIG. 7 corresponds to a 40×40 slice over 100 pulse repetitions. FIG. 5 depicts raw, noisy LADAR returns from a GMAPD array 120 in FIG. 1 (the measured photo-event array arranged into a list in step 204 of FIG. 2). FIG. 5 is a binary representation of the raw data, with array elements filled if any frame reported a photo-event at that location. As is evident, this data essentially contains points scattered across both dimensions and throughout the range of frames. FIG. 6 depicts the LADAR returns of FIG. 5 processed by simple summation, an approximation of convolution with a displacement list (step 205 in FIG. 2). That is, FIG. 6 is the result of adding all reported photo-events for a location, and putting that integer value in the location. As depicted, the data have been culled to sparser density across the two dimensions and along the range, and have been largely eliminated from both ends of the range. While a dense distribution is located near the center of the dimensional distribution at about the range marker 1,000, sufficient noise still remains surrounding that distribution and along most of the frames so that, when this portion of the image is aggregated with other points, the result would not be sharply defined or clear in the region of the respective image portion. FIG. 7 depicts the returns of FIG. 5 fully processed by applying, to the data, the process according to the present disclosure (through step 207 of FIG. 2). As illustrated, the parameterized 3D Gaussian filter and weight list used in accordance with the present disclosure produces a single density point cloud centered in the dimensional space at about the range marker 1,000. This portion of the image, when aggregated with other points, would be more sharply defined than FIG. 5 or FIG. 6.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An apparatus for converting measured photo-events from a format according to two spatial coordinates and one temporal coordinate into a format according to three spatial coordinates, the apparatus comprising:
    a laser configured to pulse laser light illuminating at least one object;
    a Geiger-mode avalanche photodiode (GMAPD) array configured to receive photons from portions of the laser light reflected off the at least one object and configured to output, for each pulse of the laser light, an array of photo-events representative of portions of the reflected laser light incident on the GMAPD array; and
    a graphics processing unit configured to
        provide a Gaussian displacement list forming a filter corresponding to a three-dimensional (3D) Gaussian distribution, the filter arranged as a list of array locations to be incremented, and a weight list specifying an amount by which to increment values based on arrival times,
        arrange the array of photo-events as a list of measured photo-events,
        convolve the Gaussian displacement list with the list of measured photo-events to produce a convolution output, and
        provide weights for blocking loss compensation according to a time of arrival of the measured photo-events, and apply the weights for blocking loss compensation to the values within the convolution output to produce a density point cloud.

2. The apparatus according to claim 1, wherein the Gaussian displacement list comprises a list of translations from an origin of the 3D Gaussian distribution.

3. The apparatus according to claim 2, wherein the Gaussian displacement list is at least one of weighted or thresholded and does not occupy a full 3D encompassing volume.

4. The apparatus according to claim 1, wherein the list of measured photo-events is a sparse list containing only non-zero values.

5. The apparatus according to claim 1, wherein the weight list more heavily weights list locations corresponding to later times within a range gate than list locations corresponding to earlier times within the range gate.

6. The apparatus according to claim 1, wherein the array of photo-events is an $N_R \times N_C$ array, wherein $N_R$ is a number of rows, $N_C$ is a number of columns, and at least one of $N_R$ and $N_C$ is greater than one, for each of a plurality of frames.

7. The apparatus according to claim 6, wherein the 3D Gaussian distribution is centered on an origin, and wherein the plurality of frames encompasses the 3D Gaussian distribution.

8. The apparatus according to claim 6, wherein the array of photo-events contains one photo-event for each of the plurality of frames.

9. The apparatus according to claim 1, wherein the graphics processing unit is further configured to aggregate an image portion represented by the density point cloud with other image portions to provide real-time image formation.

10. The apparatus according to claim 1, further comprising:
    processing circuitry coupled to the graphics processing unit and configured to receive the density point cloud and determine a range to the at least one object.

11. A method for converting measured photo-events from a format according to two spatial coordinates and one temporal coordinate into a format according to three spatial coordinates, the method comprising:
    pulsing a laser to illuminate at least one object with laser light;
    positioning a Geiger-mode avalanche photodiode (GMAPD) array to receive photons from portions of the laser light reflected off the at least one object, the GMAPD array configured to output, for each pulse of the laser light, an array of photo-events representative of portions of the reflected laser light incident on the GMAPD array;
    providing a Gaussian displacement list forming a filter corresponding to a three-dimensional (3D) Gaussian distribution, the filter arranged as a list of array locations to be incremented, and a weight list specifying an amount by which to increment array values based on arrival times;
    arranging the array of photo-events as a list of measured photo-events;
    convolving the Gaussian displacement list with the list of measured photo-events to produce a convolution output;
    provide weights for blocking loss compensation according to a time of arrival of the measured photo-events; and
    applying the weights for blocking loss compensation to the values within the convolution output to produce a density point cloud.

12. The method according to claim 11, wherein the Gaussian displacement list comprises a list of translations from an origin of the 3D Gaussian distribution.

13. The method according to claim 12, wherein the Gaussian displacement list is at least one of weighted or thresholded and does not occupy a full 3D encompassing volume.

14. The method according to claim 11, wherein the list of measured photo-events is a sparse list containing only non-zero values.

15. The method according to claim 11, wherein the weight list more heavily weights list locations corresponding to later times within a range gate than list locations corresponding to earlier times within the range gate.

16. The method according to claim 11, wherein the array of photo-events is an $N_R \times N_C$ array, wherein $N_R$ is a number of rows, $N_C$ is a number of columns, and at least one of $N_R$ and $N_C$ is greater than one, for each of a plurality of frames.

17. The method according to claim 16, wherein the 3D Gaussian distribution is centered on an origin, and wherein the plurality of frames encompasses the 3D Gaussian distribution.

18. The method according to claim 16, wherein the array of photo-events contains one photo-event for each of the plurality of frames.

19. The method according to claim 11, further comprising:
- aggregating an image portion represented by the density point cloud with other image portions to provide real-time image formation.

20. The method according to claim 11, further comprising:
- receiving the density point cloud; and
- determining a range to the at least one object.

* * * * *

UNITED STATES PATENT AND TRADEMARK OFFICE
CERTIFICATE OF CORRECTION

| | | |
|---|---|---|
| PATENT NO. | : 11,415,697 B2 | Page 1 of 1 |
| APPLICATION NO. | : 16/419768 | |
| DATED | : August 16, 2022 | |
| INVENTOR(S) | : Newman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this
Eleventh Day of February, 2025

Coke Morgan Stewart
*Acting Director of the United States Patent and Trademark Office*